Figure 1:
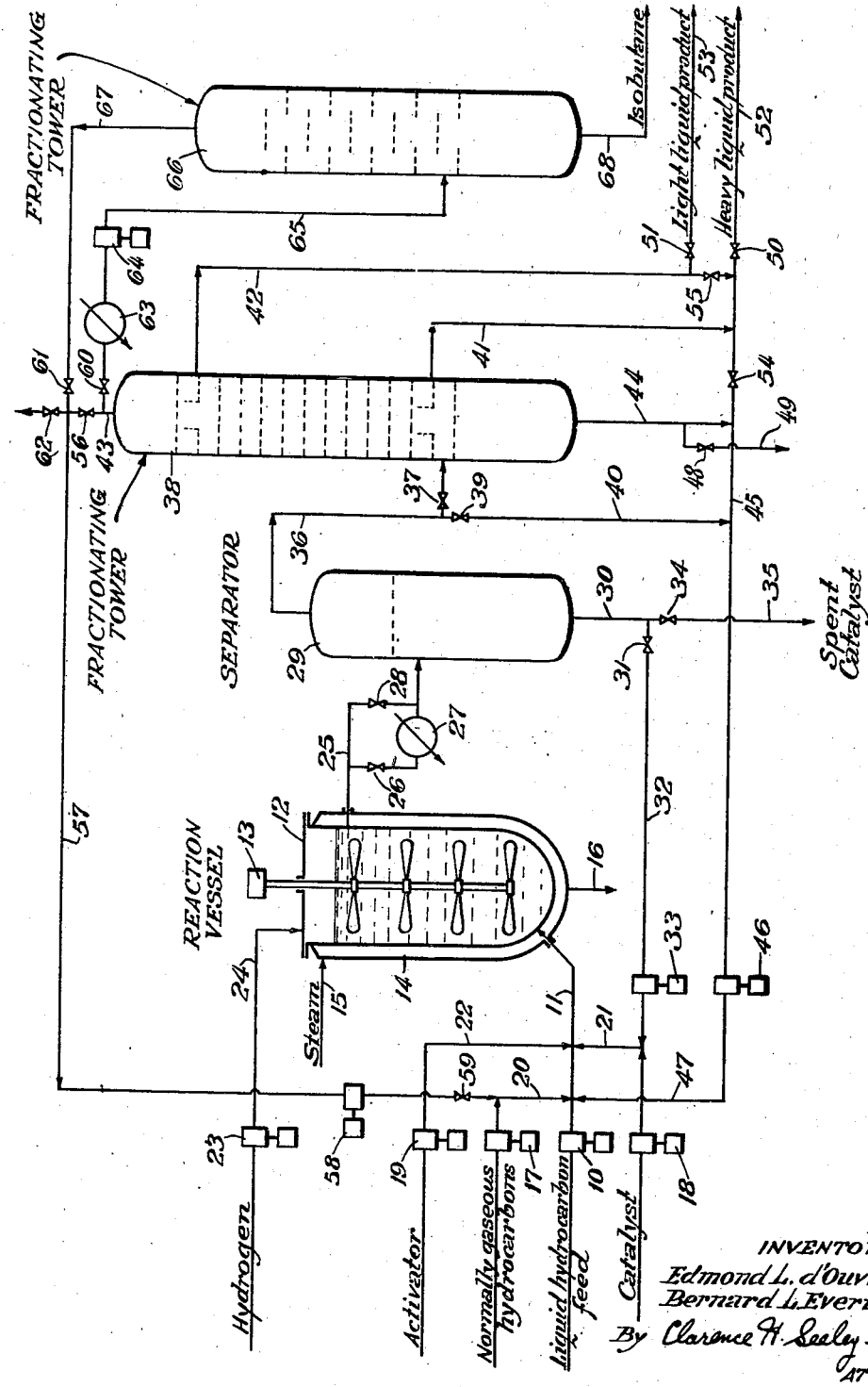

Dec. 16, 1941.  E. L. D'OUVILLE ET AL  2,266,012
PRODUCTION OF BRANCHED-CHAIN PARAFFIN HYDROCARBONS
Filed Dec. 14, 1938  2 Sheets-Sheet 1

INVENTORS:
Edmond L. d'Ouville
Bernard L. Evering
By Clarence H. Seeley
ATTY.

Patented Dec. 16, 1941

2,266,012

UNITED STATES PATENT OFFICE 2,266,012

PRODUCTION OF BRANCHED-CHAIN PARAFFIN HYDROCARBONS

Edmond L. d'Ouville and Bernard L. Evering, Chicago, Ill., assignors to Standard Oil Company, Chicago, Ill., a corporation of Indiana Application December 14, 1938, Serial No. 245,570

14 Claims. (Cl. 260—676)

This invention relates to the production of branched-chain paraffin hydrocarbons from normally liquid hydrocarbons and more particularly to the conversion of normally liquid saturated hydrocarbons and mixtures thereof containing a large proportion of straight-chain paraffins into products consisting predominantly of branched-chain paraffin hydrocarbons.

In the operation of many petroleum refineries considerable quantities of straight run naphthas are available which contain such large proportions of straight-chain paraffin hydrocarbons that they are virtually useless for blending into motor fuel because of their extremely low antiknock values, which may range for example from about 40 to below zero octane number. On the other hand branched-chain paraffin hydrocarbons are quite valuable, those having from 5 to 12 carbon atoms per molecule being very desirable constituents of motor fuels because of their high antiknock values and freedom from gum-forming tendencies. Mixtures of these hydrocarbons which contain from 5 to 7 carbon atoms per molecule are particularly suited for use as constituents of airplane fuels due to their relatively high heat content per unit weight of fuel, and such mixtures can be readily and economically produced by means of our invention. In addition the normally liquid branched-chain paraffins as well as isobutane, which can also be one of our products, are very useful as starting materials in the manufacture of many chemical products.

By carrying out our invention according to certain modifications thereof, an important product is isobutane, and this is a key material for the preparation of hydrocarbon products which have a premium value. For example, the isobutane can be alkylated with olefins such as propylene, the butylenes, or gases containing them in the presence of suitable catalysts such as sulfuric acid to produce higher isoparaffins of excellent antiknock and stability characteristics, or it can be dehydrogenated to isobutylene over a catalyst such as chromic oxide gel or magnesium chromite and this isobutylene polymerized by known means to resins, lubricating oils or di-isobutylene. The latter compound is of course easily converted to so-called iso-octane by hydrogenation, and the dehydrogenation step is a convenient source of hydrogen for the hydrogenation of the di-isobutylene, or this hydrogen can be used in carrying out the conversion of straight-chain to branched-chain paraffin hydrocarbons according to our invention.

Other investigators have proposed methods of producing iso-butane and higher saturated branched-chain hydrocarbons from straight-chain paraffins using aluminum chloride as the catalyst, but these methods result in such low yields of the desired products based on the catalyst consumed that they are much too expensive for practical use. Aluminum chloride very readily forms a complex with the hydrocarbons present, and the rapid degradation of this complex to an inactive sludge has been a major factor in the low yields obtained by prior methods.

We have found that excellent yields of branched-chain saturated hydrocarbons can be obtained from normally liquid paraffin hydrocarbons by subjecting them at relatively high temperatures and pressures to the action of a catalyst of the aluminum chloride type in the presence of an activator, hydrogen and light paraffinic gas. The nature and amount of this paraffinic gas used depends to a great extent upon the products desired and this relationship will subsequently be discussed in detail.

Figure 2:
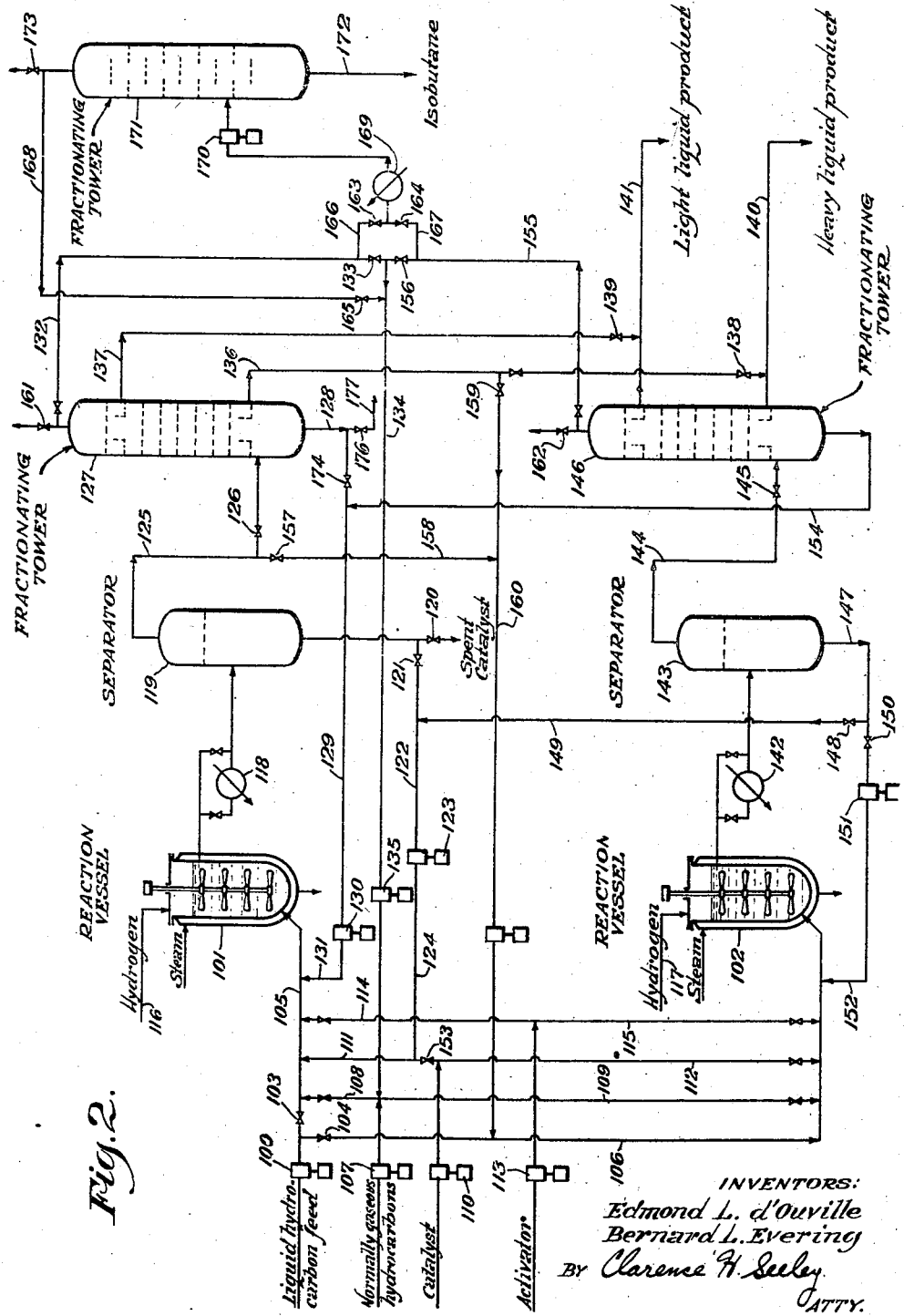

It is an object of our invention to provide a process for the production of branched-chain saturated hydrocarbons with high yields per unit of catalyst consumed from normally liquid saturated hydrocarbons such as predominantly paraffinic naphthas. Another object is to provide a process whereby naphthas of low antiknock values are converted into saturated branched-chain paraffin hydrocarbons of high stability, high knock rating and of volatility suitable for use as airplane fuels. Still another object is to provide a method of preparing a product consisting substantially of isobutane from liquid straight-chain paraffin hydrocarbons and mixtures thereof. Other objects, advantages and uses of our invention will appear from the following detailed description read in conjunction with the drawings which form a part of this specification and in which:

Figure 1 shows in a schematic manner an apparatus suitable for carrying out our invention in certain of its modifications; and Figure 2 shows schematically a form of apparatus for carrying out our invention in a two-stage modification which is advantageous under some conditions.

In one of its broad aspects our invention comprises the reaction of normally liquid hydrocarbons which are essentially paraffinic in nature and at least predominantly of straight-chain configuration in the presence of a catalyst of the aluminum chloride type at a temperature in the range from about 300° F. to about 550° F., preferably 350° F. to 475° F., and a pressure in the range from about 500 to about 6000 pounds per square inch, and with the addition of an activator, free hydrogen and a paraffinic gas consisting predominantly of propane with or without one or both of the butanes.

The feed stock to our process can be a relatively pure normally liquid straight-chain paraffin hydrocarbon such as normal heptane, but generally predominantly paraffinic straight-run naphthas such as those from Mt. Pleasant, Pennsylvania, or Mid-Continent crude oil are preferred since they are much more readily available. It is very important that the feed stock be almost free from aromatic hydrocarbons since they have been found to reduce the activity of the catalyst to a very marked degree and consequently seriously limit the amount of conversion obtained per unit weight of catalyst. Our preferred feed stock therefore contains less than 5% and preferably 0.5-1.0% or less of aromatic hydrocarbons. In many cases a preliminary solvent extraction step is necessary or desirable to reduce the aromatic content of the feed to a value sufficiently low to minimize interference with the catalyst activity.

Our invention is not applicable to cracked naphthas because of their large content of aromatics and olefins. A relatively small amount of the latter can be tolerated in the reaction, but they are preferably substantially absent since they tend to reduce the catalyst activity, although not as markedly as do the aromatics. Naphthenic or cycloparaffinic hydrocarbons on the other hand are not injurious to catalyst life but react with great facility to form isomers, cyclohexane for example being converted to methylcyclopentane almost quantitatively. Since the conversion of straight-chain paraffin hydrocarbons of low value into the more useful branched-chain paraffin hydrocarbons is the desired reaction, it is preferred to use a feed stock containing a relatively small proportion of naphthenes.

The liquid feed to our process can have a wide boiling range, a relatively narrow one, or, as indicated above, it can be a substantially pure normal paraffin hydrocarbon. In general the feed stock will boil within the range from about 100° F. to about 500° F. Under some conditions, however, it is advantageous to use a feed boiling above about 235° F. and containing hydrocarbons having 8 or more carbon atoms per molecule for the reason that this facilitates the separation of unreacted feed from the more volatile liquid branched-chain paraffins obtained in the reaction and consequently allows recycling of the former and a greater degree of over-all conversion.

The aluminum chloride type catalyst used in carrying out our invention can be for example, aluminum chloride or aluminum bromide in anhydrous form, and it is preferably introduced into the reaction zone in the form of a slurry or solution, for instance in a portion of the feed stock. Furthermore, as will be brought out below, the catalyst complex formed during the reaction, retains its activity for a considerable period of time and is useful for further conversion of straight-chain paraffins, especially at relatively high temperatures. In practicing our invention only small amounts of catalyst per unit weight of charge, e. g. less than 5%, are required and we prefer to use about 0.5-2.0% by weight. As activator we can use a hydrogen halide or any compound which in the presence of the catalyst yields a hydrogen halide under the reaction conditions, preferably in an amount sufficient to supply about 0.03 to 3.0 per cent by weight of hydrogen halide based on the charge. Our preferred promoter is hydrogen chloride, but hydrogen bromide, carbon tetrachloride, the alkyl halides such as methyl chloride or bromide, ethyl chloride or bromide, etc. can be used. In general the chlorinated and brominated hydrocarbons, particularly the more volatile ones, are suitable.

An important feature of our invention is the carrying out of the reaction at the relatively high temperatures and pressures specified above, namely 300° F. to 500° F. or preferably 350° F. to 475° F. and 500 to 6000 pounds per square inch. Under these conditions much higher conversions per weight of catalyst are obtained in appreciably reduced reaction times, and partially spent catalyst or complex which has little activity at lower temperatures is effective in converting further quantities of straight-chain into branched-chain paraffin hydrocarbons. This latter characteristic of high temperature operation is utilized in a two-step modification of our invention which will be described further in connection with Figure 2 of the drawings.

High temperature operation in the presence of catalyst and activator alone, however, causes increased degradation of the liquid feed to gaseous hydrocarbons, principally propane and isobutane together with a small amount of normal butane. Under exceptional circumstances a small amount of permanent gases (ethane and lighter) are obtained but this is an indication of drastic overtreatment resulting from too high a temperature, too much catalyst or too long a time of contact. We have found that the formation of propane and the butanes can be substantially completely inhibited by carrying out the reaction in the presence of a substantial amount of propane and either or both butanes, for instance 10 to 35% by weight of propane and 5 to 25% by weight of butanes based on the higher boiling paraffins present, and limiting the percent of the latter converted to a maximum of about 65 to 70% per pass. This limitation of the conversion can be controlled by regulation of the temperature and contact time in the reaction zone, but is preferably controlled by reduction in the quantity of catalyst used. When the production of substantial amounts of isobutane is desired, however, the paraffinic gas supplied to the reaction can be principally propane so that formation of further quantities of propane is inhibited while isobutane is produced in substantial yields. Normal butane is readily isomerized to isobutane in passing through the reaction zone, so that it is advantageous to add it rather than isobutane whenever it is available. Methane and ethane are without effect in preventing the degradation of liquid paraffins to gases and their presence in the reaction zone is generally undesirable since they act as diluents and complicate the handling of the reaction products, but minor quantities can, of course, be present.

As hereinabove stated we greatly prefer to carry out the reaction in the presence of free hydrogen. At the high temperatures at which the reaction is carried out according to our invention, hydrogen greatly retards the rate of deactivation of the catalyst, thereby allowing especially high yields of branched-chain products per unit of catalyst.

In some cases it may be desirable to obtain a product containing a large proportion of isobutane from the liquid feed and this can be done by reducing the quantity of butanes charged to the reaction step or, as mentioned above, eliminating their use entirely while continuing to add propane. Preferably, the reaction in this case is carried out at a higher conversion per pass, e. g. 80–85%, by using more catalyst, longer contact time, etc. Furthermore, the yield of isobutane can be raised an additional amount by recycling the heavier products, but generally these products are of such value that their further treatment is economically undesirable.

It is apparent that the process of our invention can be carried out either batch-wise or continuously, although we prefer continuous operation, and that certain portions of the apparatus must be constructed of corrosion-resistant materials to prevent rapid deterioration thereof from the active halogen compounds present. We have found that iron-compound impurities should be eliminated as far as possible from the reaction zone. For example, ferric oxide definitely lowers the amount of conversion. We have also found that the use of iron and carbon steel reaction vessels greatly decreases the amount of conversion obtainable, so that it is preferred that the reaction vessels be constructed of or lined with non-ferrous materials such as glass, ceramic substances, aluminum, etc., or corrosion-resistant alloys such as stainless steel. In the case of stainless steel containing 18% chromium and 8% nickel, it was found that a somewhat greater amount of activator was necessary in order to obtain yields of products comparable with those obtained in glass apparatus, but the cost of the additional activator may be balanced against the greater durability of stainless steel equipment.

Our invention will now be described in more detail in connection with the single stage apparatus shown in Figure 1. The normally liquid feed is introduced into the system by means of pump 10 and line 11 and thence into the lower portion of the reaction vessel 12 which is shown as a jacketed pressure vessel equipped with a stirring device 13 so that the reaction materials are thoroughly contacted. The desired reaction temperature is maintained by passing a suitable gaseous or liquid heating agent through the jacket 14 of reaction vessel 12 by means of inlet 15 and outlet 16. Light paraffinic gas consisting predominantly of propane and at least one of the butanes, catalyst slurry and activator are introduced into line 11 and mixed with the feed therein by means of pumps 17, 18 and 19, and lines 20, 21 and 22 respectively. Free hydrogen is supplied to the upper portion of reaction vessel 12 through pump 23 and line 24, and is there maintained at the desired reaction pressure, which is sufficiently high to cause the hydrogen to dissolve in the agitated reaction mixture at a rate at least as great as it is used up in the reaction. Obviously if desired a number of reaction vessels can be used in series or parallel in place of the one shown, or vessels of other types well-known in the art can be substituted therefor.

A portion of the entire reaction mixture is continuously withdrawn from the upper portion of vessel 12 through line 25 and passes either through valve 26 and cooler 27 or through by-pass valve 28 or partly through each valve into separator 29. The products consist of a catalyst complex which settles out in the lower portion of separator 29, and an upper layer consisting of a mixture of hydrocarbons containing branched-chain paraffins having from 4 to 7 or more carbon atoms per molecule, unreacted feed stock, unreacted light paraffin gases and dissolved hydrogen. The catalyst complex is continuously withdrawn from separator 29 through line 30 and either recycled to line 21 through valve 31, line 32 and pump 33 or withdrawn from the system through valve 34 and line 35, or under some conditions a portion of the complex may be continuously withdrawn from the system and the remainder recycled. The substantially spent complex can, of course, be regenerated or the aluminum halide recovered therefrom and reintroduced into the system through pump 18.

The upper layer is removed from separator 29 through line 36 and passed through valve 37 into fractionating tower 38, valve 39 in line 40 being closed. Valve 37 is preferably of the pressure-reducing type adjusted to the desired fractionating pressure. Fractionating tower 38 is of a conventional type provided with two sidestream outlets 41 and 42 and is operated so that the bottoms therefrom contain undesirably heavy hydrocarbons, the normally liquid hydrocarbons falling within a desired boiling range are withdrawn through outlets 41 and 42 and gases having less than 5 carbon atoms per molecule are withdrawn overhead through line 43. The heavy liquids collecting at the bottom of fractionator 38 are withdrawn through line 44 and are preferably recycled to line 11 for further treatment through line 45, pump 46, and line 47. Under some conditions it may be desirable to withdraw a portion of these heavy liquids from the system and this can be done through valve 48 and line 49. When using a feed stock boiling above 235° F., fractionating tower 38 can be so operated that the products and unreacted feed boiling in this range are not vaporized but collect in the tower bottom and are recycled in this manner, while the lower boiling liquid products are recovered as sidestreams through lines 41 and 42. Alternatively the conditions in fractionating tower 38 can be regulated so that the liquid products boiling in the motor fuel range, e. g. about 100–400° F., are obtained as side streams while the heavier fraction is recycled.

The sidestreams consisting predominantly of branched-chain paraffin hydrocarbons withdrawn through lines 41 and 42 are sent to storage by means of valves 50 and 51 and lines 52 and 53, respectively, valves 54 and 55 being closed. By thus keeping the desired products separated into relatively light and relatively heavy fractions, their use as blending constituents for motor fuels is facilitated and stabilization if necessary can be carried out only on the light product. However, by closing valve 51 and opening valve 55 the entire product can be withdrawn in a single stream through line 52.

The overhead passing through line 43 consists of excess hydrogen, propane, isobutane and some possibly normal butane and is preferably recycled to line 20 through valve 56, line 57, pump 58 and valve 59 to inhibit the conversion of the feed into such gases and reduce the quantity which must be introduced from outside the system. During this procedure, of course, valves 60 and 61 leading to a further fractionation system, are closed and valve 62 controlling a vent is at least partly closed. If it is desired, however, to recover the isobutane formed during the process, valve 56 is closed and valves 60 and 61 are opened so that the gas stream passes through cooler 63, pump 64 and line 65 into fractionating tower 66 which is operated under such conditions that the liquid bottoms contain the hydrocarbons having 4 carbon atoms per molecule and the overhead which is withdrawn through line 67 and valve 61 for recycling as described consists essentially of propane and hydrogen. The $C_4$ fraction is withdrawn from the bottom of tower 66 through line 68 and consists predominantly of isobutane, a large proportion of the normal butane charged through pump 17 being converted to isobutane in the process and the remainder being formed from the liquid feed.

In another type of operation which is advantageous if it is desired to obtain a product having on the average a larger number of side chains and therefore a higher antiknock value, valve 39 is opened during the early stages of a run so that most of the reaction products are recycled through lines 40 and 45, pump 46 and line 47. The branched-chain paraffins upon passing again through the system tend to become more branched in configuration and consequently have a still higher antiknock value. More and more of the products flowing through line 36 are then allowed to pass through valve 37 to the fractionating tower 38 in which these branched-chain hydrocarbons are recovered as described above, a certain percentage of the total products, however, continuing to return through valve 39 to the reaction chamber 14.

Another method of accomplishing substantially the same result consists in opening valve 54 rather than valve 39 and recycling the relatively heavy sidestream product withdrawn from fractionating tower 38 through line 41 and it may even be desirable in the early stages to recycle the products withdrawn from tower 38 through line 42 by opening valve 55. As in the previous method, however, flow through valve 54 is gradually restricted so that only a desired proportion of the products is recycled.

Still another method of operation which is applicable when isobutane is desired as a principal product is to close valve 50 entirely and recycle the entire heavy liquid product to be broken down into isobutane, which action can be facilitated by using relatively large amounts of catalyst and introducing little or no butane or isobutane into the system through pump 17 and line 20. By closing valve 51 and opening valve 55, the light liquid product can be similarly recycled. In this method of operation valves 56 and 62 are, of course, kept closed and valves 60 and 61 leading to the isobutane recovery system are open.

Figure 2 illustrates a particularly advantageous embodiment of our invention in which the conversion of straight-chain to branched-chain paraffins is carried out in two steps, the reaction zone in one step being maintained at our preferred high temperatures and pressures while in the other milder conditions, e. g. 100–300° F. are maintained. In this way the catalyst complex formed in the low temperature stage which has lost its activity under the conditions in that stage can be used at our preferred higher temperatures to convert further quantities of straight-chain hydrocarbons in accordance with the invention.

Referring now to Figure 2, the liquid feed is supplied by pump 100 to reaction vessels 101 and 102 simultaneously through valves 103 and 104 and lines 105 and 106 respectively. Similarly light paraffinic gas, catalyst slurry and activator are supplied to reaction vessels 101 and 102 by means of pump 107 and lines 108 and 109, pump 110 and lines 111 and 112, and pump 113 and lines 114 and 115, respectively. Hydrogen in excess is supplied under the desired reaction pressure directly to reaction vessels 101 and 102 through inlets 116 and 117 respectively, these vessels being of the same type as vessel 12 in Figure 1 but shown more diagrammatically for the sake of simplicity.

The reaction in reaction chamber 101 is carried out as described above and the products passed through cooler 118 to separator 119 from which the separated catalyst complex is withdrawn and either removed from the system through valve 120 or recycled through valve 121, line 122, pump 123 and line 124 into lines 111 and 105 and reaction vessel 101. The hydrocarbons and hydrogen are withdrawn from the top of separator 101 through line 125 and pass through valve 126 into fractionating tower 127 in which separation into desired products, heavy hydrocarbon materials and gases is carried out. The undesirable or unreacted heavy materials are withdrawn from the tower bottom through line 128 and recycled to line 105 by means of line 129, pump 130 and line 131, while the gaseous overhead is recycled to line 108 through line 132, valve 133, line 134 and pump 135. Optionally, of course, any portion of the heavy materials can be eliminated through valve 176 and line 177. Finally, the products are withdrawn as sidestream through lines 136 and 137, valves 138 and 139, and lines 140 and 141.

Reaction vessel 102 is maintained at a temperature of about 100–300° F. and under these conditions the formation of gaseous hydrocarbons from the liquid feed is less pronounced but the activity of the catalyst is not as well maintained as in reaction vessel 101. The total products from reaction vessel 102 pass through cooler 142, are separated from the catalyst complex in separator 143 and pass through line 144 and valve 145 to fractionating tower 146, the complex from separator 143 being passed through line 147, valve 148, and line 149 into line 122 for use in reaction vessel 101. Optionally a portion of the catalyst complex in line 147 can be recycled to reaction vessel 102 through valve 150, pump 151 and line 152, but when its activity has reached a point at which it is relatively inactive at 100–300° F. it is advantageous to restrict the amount recycled within the same stage through valve 150. As the run proceeds the flow of fresh catalyst through line 111 to reaction vessel 101 can be gradually restricted and in some cases can be completely stopped by manipulation of valve 153, so that the activity of the catalyst is exhausted at the high temperature used in one stage, while a part of the total feed is processed under mild conditions less conducive to gas formation.

The desired branched-chain paraffin products are removed as sidestreams from fractionating tower 146 and passed through lines 140 and 141 in which they are mixed with the light and heavy products from the first stage. The heavy liquids collecting in the bottom of tower 146, which may be for example largely unreacted feed when the feed stock is chosen so that it boils above 235° F., is introduced into line 128 for introduction into the first stage by means of line 154. Similarly, the gases containing less than 5 carbon atoms per molecule pass through line 155 and valve 156 into line 134 for recirculation.

In this method of operation valve 157 in line 158 and valve 159 in line 160 are kept closed. Vent valves 161 and 162 are also normally closed, but may be partially opened from time to time to allow some of the gases passing overhead from fractionating towers 127 and 146 respectively to escape from the system in order to prevent the concentration of permanent gases such as methane and ethane from building up.

Valves 163, 164 and 165 in lines 166, 167 and 168 leading to a gas fractionating system are also closed unless it is desired to obtain a fraction containing largely isobutane as one of the products. If this fraction is desired, valves 163, 164 and 165 are opened and valves 133 and 156 closed, so that the gases from both fractionating towers 127 and 146 are combined and passed through cooler 169 and pump 170 to fractionating tower 171, in which the hydrocarbons containing four carbon atoms per molecule are separated from the lighter gases as a liquid fraction, which consists largely of isobutane and is withdrawn from the system through line 172. The overhead, which consists largely of propane and hydrogen, is then recycled through line 168, valve 165, line 134, and pump 135; or a portion may be vented through valve 173 to prevent accumulation of undesirable permanent gases in the system. Optionally overhead from either tower 127 or tower 146 may be sent to tower 171 for isobutane recovery while overhead from the other is recycled directly.

In another modification of our invention we use the second stage operating at relatively low temperatures for the purpose of increasing the average number of side chains per molecule in the product and this can be accomplished by closing valves 104, 126, 133, 138, 139, 159 and 174, and passing the entire hydrocarbon mixture together with hydrogen from separator 119 through line 125, valve 157, lines 158 and 160, and pump 175, and to line 106 for introduction into reaction vessel 102. In this way the already branched-chain paraffins formed in reaction vessel 101 are subjected to further treatment to increase the degree of branching but under such mild conditions that degradation to gaseous hydrocarbons is minimized.

In still another method of accomplishing this result, valve 157 is closed and valves 126, 133, 139, 159 and 174 are opened so that fractionating tower 127 is again operated and the heavier branched-chain products in line 136 are passed through valve 159, line 160, and pump 175 into line 106 for introduction into the second stage of the process. The last two methods of course include the use of the catalyst complex from the separator 143 of the low temperature stage as all or a part of the catalyst required for the higher temperature conversion in reaction vessel 101, and other features mentioned in connection with the detailed description of Figure 2.

It is apparent that we have described a method of producing branched-chain paraffin hydrocarbons from straight-chain paraffin hydrocarbons with excellent yields and using a minimum of catalyst. In the following table the results of two runs are given which were made in glass-lined apparatus using pure normal heptane in the presence of an excess of hydrogen. Run A illustrates the results obtainable according to our invention while run B shows that in the absence of propane and the butanes, large amounts of propane and isobutane are produced from the normal heptane rather than the more valuable branched-chain paraffins having five or more carbon atoms per molecule.

| | | Run No. | |
|---|---|---|---|
| | | A | B |
| Charge: | | | |
| N-heptane | grams | 68.4 | 68.4 |
| Propane | do | 18.1 | |
| Isobutane | do | 15.5 | |
| AlCl₃ | do | 0.63 | 1.0 |
| HCl | do | 17.0 | 10.0 |
| Temperature | °F | 400 | 400 |
| Pressure | lbs./sq. in. | 3,800 | 3,275 |
| Time | hrs | 8.25 | 8.0 |
| Percent of N-heptane converted | | 38.8 | 73 |
| Mols converted per mol AlCl₃ | | .56 | 66 |
| Analysis of converted products: | | | |
| Propane and lighter | percent | | 29.0 |
| Isobutane | do | 3.1 | 30.6 |
| C₅ fraction | do | 8.9 | 11.8 |
| C₆ fraction | do | 17.3 | 4.3 |
| C₇ fraction | do | 70.7 | 21.2 |
| Lost to catalyst complex | do | | 2.9 |

Runs A and B are not strictly comparable inasmuch as the total percentages converted differ considerably, and the conversion was slightly high in run B for the economical production of normally liquid branched-chain paraffins. Nevertheless the suppression of the degradation of liquid to gaseous hydrocarbons by the added propane and isobutane is clearly shown. Run B also illustrates the formation of isobutane from normal heptane although in this instance the formation of propane was not inhibited.

Many modifications of our invention and of the apparatus shown herein for carrying out the same will be apparent to those skilled in the art, and they will be able to supply numerous details not illustrated in the drawings, such as heat exchangers, provisions for fractionating tower control, etc. We do not desire to be limited to the specific modifications and examples used in illustrating our invention, but only by the scope of the appended claims.

We claim:

1. The process of converting a substantial portion of the straight-chain paraffin hydrocarbons in a substantially saturated normally liquid hydrocarbon fraction to branched-chain paraffin hydrocarbons which comprises contacting an admixture of said hydrocarbon fraction, an aluminum halide catalyst effective in causing said conversion, an activator for said catalyst, free hydrogen and a paraffinic gas containing a substantial amount of propane in a reaction zone maintained at a temperature in the range from about 300° F. to about 550° F. and a pressure in the range from about 500 to about 6000 pounds per square inch, said propane being present in said reaction zone in an amount lying in the range from about 10% to about 35% by weight based on the straight-chain paraffin hydrocarbons present.

2. The process of claim 1 wherein said temperature lies in the range from about 350° F. to about 475° F.

3. The process of claim 1 wherein the amount of said catalyst used is from 0.5% to 2.0% by weight of said hydrocarbon fraction.

4. The process of claim 1 wherein said catalyst is selected from the group consisting of aluminum chloride and aluminum bromide and said activator is a compound affording a hydrogen halide under the reaction conditions.

5. The process of converting a substantial portion of the straight-chain paraffin hydrocarbons in a substantially saturated normally liquid hydrocarbon fraction to branched-chain paraffin hydrocarbons which comprises contacting an admixture of said hydrocarbon fraction, an aluminum halide catalyst effective in causing said conversion, an activator for said catalyst, free hydrogen and a paraffinic gas consisting predominantly of propane and at least one of the butanes in a reaction zone maintained at a temperature in the range from about 300° F. to about 550° F. and a pressure in the range from about 500 to about 6000 pounds per square inch, said propane being present in said reaction zone in an amount lying in the range from about 10% to about 35% by weight and said butane being present in an amount lying in the range from about 5% to about 25% by weight based on the straight-chain paraffin hydrocarbons present.

6. The process of preparing liquid branched-chain paraffin hydrocarbons from a substantially saturated hydrocarbon fraction rich in straight-chain paraffin hydrocarbons and boiling within the range from about 100° F. to about 500° F. which comprises contacting an admixture of said hydrocarbon fraction, an aluminum halide catalyst effective in converting straight-chain to branched-chain paraffin hydrocarbons, an activator for said catalyst, free hydrogen and a paraffinic gas containing substantial amounts of propane and at least one of the butanes in a reaction zone maintained at a temperature in the range from about 300° F. to about 550° F. and a pressure in the range from about 500 to about 6000 pounds per square inch whereby not more than 65% to 70% of said straight-chain paraffin hydrocarbons undergoes reaction per pass through said reaction zone, said propane being present in said reaction zone in an amount lying in the range from about 10% to about 35% by weight and said butane being present in an amount lying in the range from about 5% to about 25% by weight based on the straight-chain paraffin hydrocarbons present, withdrawing the products from said reaction zone, separating said products into a catalyst-containing portion, a liquid fraction containing hydrocarbons having at least five carbon atoms per molecule and a gaseous fraction containing hydrocarbons with less than five carbons per molecule, and returning at least a major portion of said gaseous fraction to said reaction zone.

7. The process of claim 6 including the step of returning at least a part of said catalyst-containing portion to said reaction zone.

8. The process of preparing liquid branched-chain paraffin hydrocarbons from a substantially saturated hydrocarbon fraction rich in straight-chain paraffin hydrocarbons and boiling within the range from about 100° F. to about 500° F. which comprises contacting an admixture of said hydrocarbon fraction, an aluminum halide catalyst effective in converting straight-chain to branched-chain paraffin hydrocarbons, an activator for said catalyst, free hydrogen and a paraffinic gas containing substantial amounts of propane and at least one of the butanes in a reaction zone maintained at a temperature in the range from about 300° F. to about 550° F. and a pressure in the range from about 500 to about 6000 pounds per square inch, said propane being present in said reaction zone in an amount lying in the range from about 10% to about 35% by weight and said butane being present in an amount lying in the range from about 5% to about 25% by weight based on the straight-chain paraffin hydrocarbons present, withdrawing the products from said reaction zone, separating said products into a catalyst-containing portion and a hydrocarbon portion, returning at least a part of said catalyst-containing portion to said reaction zone, separating said hydrocarbon portion into a relatively heavy liquid fraction, a relatively light liquid fraction and a normally gaseous fraction, and returning at least a portion of said relatively heavy liquid fraction and said gaseous fraction to said reaction zone.

9. The process of preparing isobutane from normal butane and a substantially saturated hydrocarbon naphtha rich in straight-chain paraffin hydrocarbons which comprises contacting an admixture of said hydrocarbon naphtha, normal butane, an aluminum halide catalyst effective in converting straight-chain to branched-chain paraffin hydrocarbons, an activator for said catalyst, free hydrogen and propane in a reaction zone maintained at a temperature in the range from about 300° F. to about 550° F. and a pressure in the range from about 500 to about 6000 pounds per square inch, said propane being present in said reaction zone in an amount lying in the range from about 10% to about 35% by weight based on the straight-chain paraffin hydrocarbons present.

10. The process of preparing isobutane from a substantially saturated hydrocabon naphtha rich in straight-chain paraffin hydrocarbons which comprises contacting an admixture of said hydrocarbon naphtha, an aluminum halide catalyst effective in converting straight-chain to branched-chain paraffin hydrocarbons, an activator for said catalyst, free hydrogen and propane in a reaction zone maintained at a temperature in the range from about 300° F. to about 550° F. and a pressure in the range from about 500 to about 6000 pounds per square inch, said propane being present in said reaction zone in an amount lying in the range from about 10% to about 35% by weight based on the straight-chain paraffin hydrocarbons present, removing the products from said reaction zone, separating a normally gaseous fraction from said products, further separating said normally gaseous fraction into a relatively heavy fraction consisting predominantly of hydrocarbons having four carbons per molecule and containing a large proportion of isobutane and a relatively light fraction containing propane, and returning at least a part of said relatively light fraction to said reaction zone.

11. The process of preparing liquid branched-chain paraffin hydrocarbons and isobutane from a substantially saturated hydrocarbon naphtha rich in liquid straight-chain paraffin hydrocarbons which comprises contacting an admixture of said hydrocarbon naphtha, an aluminum halide catalyst effective in converting straight-chain to branched-chain paraffin hydrocarbons, an activator for said catalyst, free hydrogen and propane in a reaction zone maintained at a temperature in the range from about 300° F. to about 550° F. and a pressure in the range from about 500 to about 6000 pounds per square inch, said propane being present in said reaction zone in an amount lying in the range from about 10% to about 35% by weight based on the straight-chain paraffin hydrocarbons present, removing the products from said reaction zone, separating said products into a catalyst-containing portion, a normally liquid fraction and a normally gaseous fraction, further separating said gaseous fraction into a relatively heavy fraction consisting predominantly of hydrocarbons having four carbons per molecule and containing a large proportion of isobutane and a relatively light fraction containing propane, and returning at least a part of said relatively light fraction to said reaction zone.

12. The process of converting a substantial portion of the straight-chain paraffin hydrocarbons in substantially saturated normally liquid hydrocarbon fractions to branched-chain paraffin hydrocarbons which comprises contacting an admixture of a substantially saturated normally liquid hydrocarbon fraction, an aluminum halide catalyst effective in causing said conversion, an activator for said catalyst, free hydrogen and a paraffinic gas containing a substantial amount of propane in a first reaction zone maintained at a temperature in the range from about 300° F. to about 550° F. and a pressure in the range from about 500 to about 6000 pounds per square inch, said propane being present in an amount lying in the range from about 10% to about 35% by weight based on the straight-chain paraffin hydrocarbons present, removing the products from said first reaction zone, contacting an admixture of a second substantially saturated normally liquid hydrocarbon fraction and further quantities of said catalyst, said activator and free hydrogen in a second reaction zone maintained at a temperature in the range from about 100° F. to about 300° F., separating the products from said second reaction zone into a catalyst-containing portion and a hydrocarbon portion, and introducing at least a part of said catalyst-containing portion into said first reaction zone.

13. The process of converting a substantial portion of the straight-chain paraffin hydrocarbons in a substantially saturated normally liquid hydrocarbon fraction to branched-chain paraffin hydrocarbons which comprises contacting an admixture of a substantially saturated normally liquid hydrocarbon fraction, an aluminum halide catalyst effective in causing said conversion, an activator for said catalyst, free hydrogen and a paraffinic gas containing a substantial amount of propane in a first reaction zone maintained at a temperature in the range from about 300° F. to about 550° F. and a pressure in the range from about 500 to about 6000 pounds per square inch, said propane being present in an amount lying in the range from about 10% to about 35% by weight based on the straight-chain paraffin hydrocarbons present, removing the products from said first reaction zone, separating said products into a catalyst-containing portion and a hydrocarbon portion, contacting an admixture of at least a part of said hydrocarbon portion and further quantities of said catalyst, said activator and free hydrogen in a second reaction zone maintained at a temperature in the range from about 100° F. to about 300° F., removing the products from said second reaction zone and recovering branched-chain paraffin hydrocarbons from said last-mentioned products.

14. The process of claim 13 wherein said paraffinic gas contains an amount of at least one of the butanes lying in the range from about 5% to about 25% by weight based on the straight-chain paraffin hydrocarbons present.

EDMOND L. D'OUVILLE.
BERNARD L. EVERING.